Figure 1:
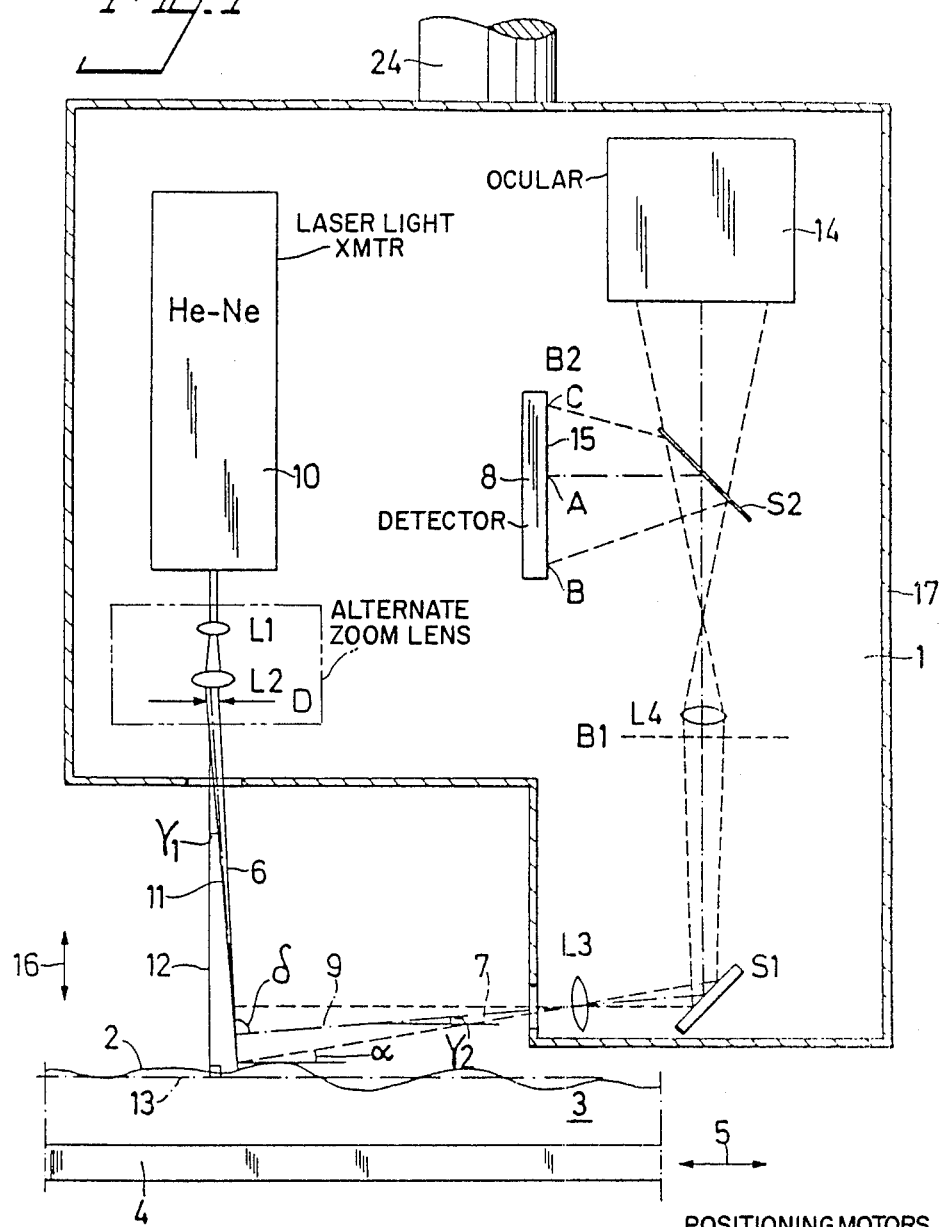

United States Patent [19]

Johansson

[11] Patent Number: 4,764,016

[45] Date of Patent: Aug. 16, 1988

[54] INSTRUMENT FOR MEASURING THE TOPOGRAPHY OF A SURFACE

[75] Inventor: Gunnar Johansson, Mölndal, Sweden

[73] Assignee: Anders Bengtsson, Kungalv, Sweden; a part interest

[21] Appl. No.: 31,012

[22] PCT Filed: Jun. 13, 1986

[86] PCT No.: PCT/SE86/00287

§ 371 Date: Feb. 10, 1987

§ 102(e) Date: Feb. 10, 1987

[87] PCT Pub. No.: WO86/07444

PCT Pub. Date: Dec. 18, 1986

[30] Foreign Application Priority Data

Jun. 14, 1985 [SE] Sweden ............................ 8502977.5

[51] Int. Cl.$^4$ ............................................. G01B 11/30
[52] U.S. Cl. ...................................... 356/371; 356/376
[58] Field of Search ........................... 356/1, 371, 376

[56] References Cited

U.S. PATENT DOCUMENTS 3,625,618  12/1971  Bickel ................................ 356/376

Primary Examiner—F. L. Evans
Attorney, Agent, or Firm—Nies, Webner, Kurz & Bergert

[57] ABSTRACT

An instrument for measuring the topography of a surface, comprising a light transmitting device for transmitting a light beam onto the surface; a light receiving device for receiving light reflected by the surface; a detector for detecting the position of the received light relative to the optical axis of the light receiving device; and means for providing relative movement between on one hand the light transmitting (10,L1,L2) and light receiving (L3,L4,8) devices, and on the other hand the surface (2) to be measured. According to the invention the optical axis (11) of the light transmitting device (10,L1,L2) is arranged to form a small angle ($\gamma_1$) with the normal to the median plane (13) of a workpiece surface (2) to be measured. The angle ($\gamma_1$) is smaller than about 15°. The optical axis (9) of the light receiving device (L3,L4) forms a right angle, or substantially a right angle (8) with the optical axis of the light transmitting device. The detector (8) is position-responsive, and an image magnifying lens (14) is located in front of the detector.

9 Claims, 1 Drawing Sheet

INSTRUMENT FOR MEASURING THE TOPOGRAPHY OF A SURFACE

The present invention relates to an instrument for measuring the topography of a surface. By the topography of a surface is meant both the micro and the macro irregularities in the surface.

The present invention utilizes the known principle of transmitting a beam of light onto the surface being measured and receiving the light reflected by the surface and therewith determine the topography or irregularities of the surface.

Such instruments are known to the art. These known instruments, however, are encumbered with several drawbacks, one of which is that the incident light impinges on the surface at a significant angle, for example 45°, and/or that the light reflected from the surface is received in a directional sense having a corresponding angle to the surface.

When the incident light impinges on the surface at a significant angle thereto, an error is obtained in the positional reading in the plane of the surface, hereinafter referred to as the horizontal positional reading. When traversing a totally flat surface in a direction perpendicular to the surface, the light spot produced on the surface by the incident beam will be displaced across the surface. Correspondingly, the light spot is displaced relative to the surface as a result of the depth profile of the surface. Thus, when the depth profile of a surface is measured with an instrument with which the incident light forms a significant angle with the surface and the surface is traversed in the horizontal plane, it is not known exactly where a given profile depth prevails, and hence an error is created in the horizontal positional reading, as before mentioned.

Another serious disadvantage is that when the reflected light is received by an optical system in which the optical axis thereof forms a significant angle with the surface, e.g. 45°, the vertical dissolution will be relatively poor, owing to the fact that the projected surface of the light spot becomes large in relation to the profile depth. This greatly influences the total resolving power of the instrument.

Another drawback experienced when the incident light beam is permitted to impinge on the surface at a significant angle thereto, e.g. 45°, is that the mean size of the light spot over a surface to be measured becomes greater than the diameter of the incident light beam.

Present day instruments of this kind are intended to measure relatively flat surfaces, where the profile depth is of the order of micrometres. In this measurement range the aforedescribed drawbacks become highly significant.

These drawbacks are eliminated, or at least greatly alleviated, by means of the present invention, which provides an instrument with which very high resolution can be achieved.

Thus, the present invention relates to an instrument for measuring the topography of a surface, comprising a light transmitting device for transmitting a light beam onto the surface; a light receiving device for receiving light reflected by the surface; a detector for detecting the position of the received light relative to the optical axis of the light receiving device; and means for providing relative movement between on one hand the light transmitting and light receiving devices, and on the other hand the surface to be measured, the instrument being characterized in that the optical axis of the light transmitting device is arranged to form a small angle with the normal to the median plane of a workpiece surface to be measured, said angle being smaller than about 15°, and preferably smaller than about 5°; in that the optical axis of the light receiving device forms a right angle, or substantially a right angle, with the optical axis of the light transmitting device; in that said detector is position-responsive; and in that an image magnifying lens is located in front of the detector.

Figure 2:
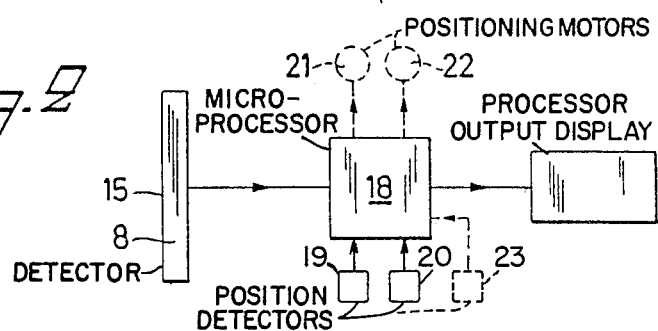

The invention will now be described in more detail with reference to an exemplifying embodiment thereof illustrated in the accompanying drawing, in which FIG. 1 illustrates schematically an instrument according to the invention; and FIG. 2 is a block schematic of an electronic part of the instrument.

FIG. 1 illustrates schematically an instrument 1 according to the present invention. The instrument 1 is intended for measuring the topography of a surface 2. The surface 2 is the surface of a workpiece 3 carried by a schematically illustrated table 4. The table 4 is arranged for movement in a direction shown by the arrow 5 and/or in a direction perpendicular to the plane of the paper.

The instrument 1 includes a light transmitting device for transmitting a light beam 6 onto the surface 2, and a light receiving device for receiving light 7 reflected from the surface, and further includes a detector 8 for detecting the position of the received light relative to the optical axis 9 of the light receiving device.

Both the light transmitting device and the light receiving device are incorporated in a housing 17 suspended from an axle 18 or the like.

The light transmitting device may consist of a low power laser, for example an He-Ne-laser 10, which transmits a laser beam which is focussed on a distance where the surlaser face 2 is to be found, by means of a conventional lens system comprising, for example, two lenses L1 and L2.

According to the invention the optical axis 11 of the light transmitting device is arranged to form a small angle $\gamma_1$ with a normal 12 to the main plane extension 13 of the workpiece surface 2. The angle $\gamma_1$ shall be smaller than about 15°, and preferably smaller than about 5°. The angle may thus also be 0° (zero degrees). This means that the aforesaid horizontal positional reading can be effected with a high degree of accuracy, and that the resolution of the instrument is much greater than if the angle $\gamma_1$ were larger, e.g. 45°.

According to the invention, the optical axis 9 of the light receiving device forms a right angle, or substantially a right angle $\delta$ with the optical axis 11 of the light transmitting device. The angle $\delta$ shall exceed about 75°, and preferably exceeds 85°.

This affords the advantage that the light spot illuminated on the surface 2 will be held constantly in the focus of the imaging lens system. Because the angle $\gamma_1$, and therewith the angle $\gamma_2$, between the plane 13 and the optical axis 9 of the imaging lens system are small and equal, or substantially equal, it is not possible for reasons of space to place a highly magnifying lens system close to the surface 2 along the optical axis 9 of the imaging lens system. Consequently, there is placed in the beam path of the light receiving device a relay lens L3 which captures the light reflected against the surface 2. In accordance with one embodiment of the invention, a mirror S1 is arranged to reflect light arriving through the relay lens. The relay lens L3 has a long focal length, e.g. 30 mm.

According to the invention the light receiving device includes an image magnifying lens L4. The image magnifying lens has a so-called microscope lens of high magnification. For example, the focal length is only 2.5 mm.

In accordance with one preferred embodiment there is located downstream of the microscope lens L4, in the beam path, a semi-transparent mirror S2, which is arranged to conduct light to the detector 8 and to an ocular or eyepiece 14, through which the light spot can be observed on the surface 2 with the eye, the light spot being used to adjust the setting of the optical axes 11, 9, so that the light spot can be imaged with full sharpness on the surface 2.

The sharpness of the image is adjusted by displacing the housing 17 towards or away from the surface 2, with the aid of known suitable setting means, such as gear racks which motivate the aforesaid axle 18.

The use of a microscope lens is an extremely important feature, since the magnification obtained therewith in combination with a position-responsive detector 8 whose size is consequently adapted thereto results in high resolution of the instrument. The position-responsive detector is of a known kind readily available on the market and is arranged to produce an electric outputsignal in response to the position where the light spot strikes the detector surface 15, in the form of a coordinate. The detector 15 is also of the kind with which the aforesaid coordinate is given as the centre of mass of the light spot impinging on the detector.

Because the laser light has Gaussian intensity distribution, the detector will give a highly accurate indication of the position of the light spot on the detector. Any suitable detector may be used. For example, the detector used may be one designated type LSC4 and retailed by United Detector Technology, Hawthorn, Calif., USA.

Thus, a laser beam 6 is focussed on the surface 2 whose surface smoothness or surface configuration is to be measured. This is effected with the lens system L1, L2, with the aid of which it is also possible to expand the beam and to cause the beam to impinge on the surface at the incidence angle $\gamma_1$. An illuminated spot is obtained on the surface in this way. This spot is imaged with the lens system L3, L4, via the mirror S1, on an image plane B2, in which the position-responsive detector 8 has been placed.

When the illuminated spot on the surface is located precisely along the optical axis 9 of the imaged lens system, the image of the illuminated spot is obtained at location A on the detector 8. When the illuminated spot is located beneath the optical axis 9 of the imaging lens system, the image is obtained at location C on the detector, while when the illuminated spot is located above said optical axis the image is obtained in location B.

By translating either the workpiece surface 2 or the instrument housing 17 in horizontal direction referenced 5, the surface 2 is caused to be illuminated at a number of points along a line. The illuminated spot will herewith move up and down in accordance with the topography of the surface and in dependence on whether the surface is locally above or beneath the optical axis 9 of the imaging system. The position detected is a direct measurement of the local distance between the surface and a reference plane, which may comprise the median plane 13 of the surface 2.

Resolution of the instrument in the vertical direction 16 is determined by the imaging lens system. Consequently, it is important that the angle $\gamma_1$ in FIG. 1 is as small as possible, otherwise there is obtained a significant error in the horizontal position reading, as discussed in the aforegoing. In addition, the optical axis 11 of the light transmitting device and the optical axis of the imaging optical system shall form a right angle, or substantially a right angle, since otherwise the illuminated spot will not be sharply imaged or reproduced when the profile depth varies, as before mentioned.

The relay lens L3 gives a primary image of the illuminated spot in an image plane B1. This image should be obtained at a distance from the optical axis 7 extending between the mirror S1 and the lens L4 which is of the same order of magnitude as the distance between the illuminated spot and the optical axis 9 of the receiving lens system. This distance is too small to be measured accurately with a position-responsive detector. Consequently, as before mentioned, the image B1 is reproduced on the image plane B2 with the aid of the microscope lens L4, therewith greatly magnifying the distance between the image of the illuminated spot and the optical axis 9. It is possible when using the described instrument to (a) utilize a small angle $\gamma_1$ and therewith obtain accurate representation of the horizontal position, (b) to arrange that $\gamma_2 = \gamma_1$ and therewith ensure that the illuminated spot is always in the focus of the imaging lens system, and c) to use a magnifying lens L4 of high magnification, so that small profile depths can also be measured accurately.

The use, in principle, of an ocular or eye-piece for manual viewing, as illustrated in FIG. 1, enables the instrument to be adjusted or set to the correct distance from the surface whose structure is to be determined. This is done by viewing the surface through the ocular 14. When the illuminated part of the surface 2 is sharply imaged, it means that this part of the surface is in the focus of the imaging lens system.

The resolving power of the instrument can be calculated as horizontal resolution, i.e. the size of the light spot on the surface 2, and as vertical resolution, i.e. the vertical position of the light spot in relation to the reference plane.

The following calculations of the possible resolving power of the instrument are based on the assurtion that the light transmitted is a laser. A resolving power of the same order of magnitude can be obtained with a convention light source, however.

The size d of the illuminated spot (and therewith the spatial resolving power of the instrument) is a function of the diameter (D) of the incident beam at the exit of the lens L2, the focal length $f_2$ of the lens L2, and the distance of the surface 2 from the theoretical focus of the beam. The following equation then applies:

$$d = \sqrt{\left(\frac{4}{\pi} \cdot \lambda \cdot F\right)^2 + \left(\frac{z}{F}\right)^2}$$

where $\lambda$ is the wavelength of the laser light, $F = f_2/D$, and z is the distance between the lens L2 and the illuminated spot. It is possible, by varying F, to obtain varying resolution and maximum profile depth with retained focus on the surface 2.

A laser beam which passes through a lens system will contract downstream of the lenses, so that the beam of light rays obtains a waist. By maximum profile depth with retained focus is meant that the length of the beam in the region where the beam diameter along its waist is smaller than a given diameter (d). In the following Table, Table 1, the aforesaid length is shown in dependence on the maximum diameter (d) for maintaining the requisite focus in dependence on the magnitude F. Thus, focussing on the surface is maintained along the aforesaid waist.

TABLE 1

Maximum profile depth with retained focus in mm for $\lambda = 0.6328$ μm

| diameter (d) of the beam in μm | F = 10 | F = 20 | F = 50 | F = 100 |
|---|---|---|---|---|
| 5 | 0.118 | | | |
| 10 | 0.199 | | | |
| 20 | 0.400 | 0.474 | | |
| 50 | 1.000 | 1.893 | 2.962 | |
| 100 | 2.000 | 3.948 | 9.153 | 11.846 |
| 200 | 4.000 | 7.974 | 19.590 | 36.611 |

It will be seen from Table 1 that when using a light spot having a diameter of 20 μm, there is obtained a maximum permitted variation in profile depth of 0.4 mm for an F-10 lens, and a somewhat larger profile depth of 0.474 mm when an F-20 lens is used. If a higher degree of resolution is required, a lens of smaller F-number than 20 must be used, wherewith the permitted profile depth decreases. If a large light spot can be allowed, however, a lens of higher F-number can be used, with a subsequent increase in the permitted profile depth.

It should be mentioned here that the diameter of the light spot is a conservative measurement of the horizontal resolving power of the instrument. The position-responsive detector[8] produces an output signal which is proportional to the centre of mass of the light spot imaged on the detector. This means that the "effective" diameter of the light spot is only a fraction of the total diameter.

The choice of lens used and the size of light spot applied can be adapted from case to case by those skilled in this particular art.

With regard to the resolution of the instrument in the vertical direction, i.e. the vertical position of the illuminated spot in relation to a reference plane, which may be the plane 13, it is necessary to carry out a comprehensive investigation in order to establish this resolution. Consequently, all that is given here is an appreciation of the resolution capable of being obtained under the worst conceivable circumstances, and an appreciation of typical workshop conditions.

When viewed through the imaging lens system, the illuminated spot is seen as an ellipse-like surface. Its width is equal to the diameter (d) of the beam, while its height is the width projected on a plane perpendicular to the optical axis (9) of the imaging lens system. The height can be expressed as $$\delta h = d \cdot \frac{\sin(\gamma_2 - \alpha)}{\cos(\gamma_1 - \alpha)}$$

where h is the projected height, and $\alpha$ is the angle formed locally by the surface with the reference plane 13, vide FIG. 1. It was previously stated that the angle $\gamma_2$ shall be equal to $\gamma_1$, and that these angles shall be small. In practice the angle $\alpha$ is also very small. In the case of those surfaces of interest from the aspect of workshop practice and technology, the angle $\alpha$ may reach 5 degrees. In this case the following approximative equation applies:

$$\delta h = d \cdot (\gamma_2 - \alpha)$$

where the angles are expressed in radians. The height of the imaged "ellipse" in relation to its width is given in Table 2 below.

TABLE 2

Vertical projection of the light spot in relation to its width $\left(\frac{\delta h}{d}\right)$

| | $\alpha = -5°$ | $\alpha = -2°$ | $\alpha = 0°$ | $\alpha = +2°$ | $\alpha = +5°$ |
|---|---|---|---|---|---|
| $\gamma_2 = 5°$ | 0.175 | 0.122 | 0.087 | 0.052 | 0.000 |
| $\gamma_2 = 7°$ | 0.202 | 0.157 | 0.122 | 0.087 | 0.035 |
| $\gamma_2 = 10°$ | 0.262 | 0.209 | 0.175 | 0.140 | 0.087 |

It will be seen from Table 2 that in the worst case the height of the projected illuminated light spot can constitute a quarter of its width in respect of the angles given in the Table.

It must be emphasized once more that the position-responsive detector weights the output signal against the centre of mass of the light spot. This means that the resolving power of the instrument in the vertical direction will be much greater than that given in Table 2. The improvement achieved thereby is restricted mainly by the local curvature of the surface. In the extreme case when the surface is totally flat locally, the centre of mass is exactly in the centre of the light source. In conditions such as these the resolution is determined solely by the degree of magnification selected and the resolution in the actual detector itself. The degree of magnification is selected so that the total profile depth is imaged on the whole length of the detector. In this way, with the aid of the aforesaid commercial detector 8, the instrument can be given a total resolving power according to Table 3 below.

TABLE 3

The total resolving power of the instrument in the vertical direction (μm)

| d μm | F = 10 | F = 20 | F = 50 | F = 100 |
|---|---|---|---|---|
| 5 | 0.0054 | | | |
| 10 | 0.0100 | | | |
| 20 | 0.020 | 0.024 | | |
| 50 | 0.05 | 0.095 | 0.148 | |
| 100 | 0.100 | 0.197 | 0.458 | 0.593 |
| 200 | 0.200 | 0.399 | 0.980 | 1.830 |

It will be seen herefrom that a particularly high resolving power is obtained.

The drawbacks referred to in the introduction and associated with known instruments are therewith eliminated, or at least substantially reduced.

It has been said in the aforegoing that the angle $\gamma_1$ is preferably smaller than 5°. In addition the angle must be adapted to the surface of the workpiece under examination. It should be mentioned, however, that this angle $\gamma_1$ may be 0° (zero degrees). The only essential requirement is that a light spot on the surface can be seen by at least the upper part of the lens 3 in FIG. 3 in order to be focussed on the detector 8.

It will have been noticed that measurements are made with the instrument according to the present invention in a contactless fashion. This prevents possible deformation of the surface 2 during a measuring process. Consequently, the instrument can be used to measure all manner of materials, such as metals, ceramics, rubbers, leather, paper, etc.

It has been said in the aforegoing that the table 4 can be displaced in one or two directions, suitably in a horizontal plane, and that the instrument housing 17 can be moved towards and away from the table 4, in order to adjust the sharpness of the transmitted light beam on the surface 2.

It will be understood, however, that the table 4 may, alternatively, be stationarily arranged and the housing 17 arranged (a) for movement in a direction or in a plane parallel with the table 4, for scanning or sensing a surface 2, and (b) for movement towards and away from the surface 2 for bringing the illuminated spot to the requisite degree of sharpness. In this case the axle or shaft 24 is connected to mechanical devices (not shown) for example of the aforementioned kind, arranged to effect the aforesaid movements.

FIG. 2 is a schematic illustration of a block schematic of an electronic part of the instrument. As before mentioned, the detector 8 produces an electric signal corresponding to the position of the light spot on the detector. This signal is sent to a microprocessor 18 or the like. Position sensors or detectors 19,20 are also arranged to send to the dataprocessor 18 a signal relating to the position of the table 4 in relation to the housing 17. In one embodiment the position detectors are arranged to give said position in an x-y-plane coinciding with the horizontal plane in which the table can be moved. In another embodiment the position detectors 19,20 can be arranged to give the position of the housing 17 in a corresponding x-y-plane in that case when the housing is movable and the table 4 stationary.

The microprocessor 18 is arranged, in a known manner, to process the signal arriving from the detector 8 with the signals from the position detectors 19,20, therewith to enable a curve showing the topography of the surface or the measurement values thereof with regard to the profile depth of said surface at given positions or along given lines to be illustrated or disclosed.

Thus, according to the described embodiments, the position of the light spot on the detector varies with the topography of the surface.

According to another embodiment of the invention, the distance between the housing 17 and the surface 2 is controlled so as to be constant the whole time. In this case the microprocessor 18 is arranged to control positioning means 21,22 incorporating electric motors which drive the aforesaid housing setting devices. In this respect the microprocessor 18 is arranged to control the positioning means 21,22 so that the point at which the light spot impinges on the detector is constant, preferably in the centre point A of the detector. In this case the table 4 can either be movable and the housing 17 stationary, or vice versa, the position detectors or sensors 19,20 being connected respectively to either the table 4 or to the housing 17. According to this embodiment there is provided a further position detector or sensor 23 which is arranged to measure the vertical distance between the housing and the table.

Thus, in this embodiment, the housing moves up and down in conformity with the topography of the surface 2. In this respect the last mentioned position indicator 23 is arranged to produce an electric signal which corresponds to the topography of said surface. This signal is signal-processed in the microprocessor in a manner corresponding to that aforedescribed with regard to the signal from the detector.

The advantage with this embodiment is that a very high degree of resolution is obtained in both the horizontal and vertical directions, while permitting at the same time a very wide variation in profile depth. The embodiment affords a particular advantage when the surface has a pronounced curvature.

Thus, with this embodiment it is possible to use the present instrument as a distance meter and therewith measure, for example, the roundness, conicity, etc. of an element. With regard to these latter applications the workpiece to be measured, for example, may be mounted on an axle whose rotational position is given by a position indicator 19 while its axial position is given by the other position indicator 20. In this case, the position of the housing relative to the surface indicated by the position indicator 23 constitutes a measurement of the roundness or conicity of the element.

The light transmitting device may alternatively comprise a conventional light source, the light emanating from which is focussed on a small aperture of from 5 to 50 μm in size. The light passing through the aperture is focussed on the point where the surface 2 is to be found, e.g. with the aid of two lenses L1 and L2.

The lenses L1 and L2 may be exchangeable with other lenses of other focal length and/or may be displaceable in relation to one another and to the light source, or may be replaced with a zoom-lens system. Any one of these alternatives will enable variations to be made in (a) the thickness of the exiting light beam, (b) the angle $\gamma_1$ formed between the optical angle 11 of the beam 6, and (c) the normal 12 to the main extension plane 13 of the workpiece 3.

It will be obvious that many variations are possible, particularly with regard to the application in question.

Consequently, the present invention shall not be considered to be restricted to the described and illustrated embodiments, since modifications and variants can be made within the scope of the following claims.

I claim:

1. An instrument for measuring the topography of a surface, comprising a light transmitting device for transmitting a light beam onto the surface; a light receiving device for receiving light reflected by the surface; a detector for detecting the position of the received light relative to the optical axis of the light reeiving device; and means for producing relative movement between on one hand the light transmitting (10,L1,L2) and light receiving devices (L3,L4,8) and on the other hand the surface (2) to be measured, characterized in that the optical axis (11) of the light transmitting device is arranged to form a small angle ($\gamma_1$) with the normal of the median plane (13) of a workpiece surface (2) to be measured, said angle ($\gamma_1$) being smaller than about 15° in that the optical axis (9) of the light receiving device (L3,L4) forms substantially a right angle ($\delta$) with the optical axis (11) of the light transmitting device; in that said detector (8) is positionresponsive; and in that an image magnifying lens (L4) is located in front of the detector (8), said image magnifying lens (L4) being a microscope lens of short focal length.

2. An instrument according to claim 1, characterized in that a relay lens (L3) is placed in the beam path of the light receiving device and arranged to capture light reflected by said surface (2); and in that there is provided a mirror (S1) for reflecting light entering through the relay lens (L3) to the microscope lens (L4).

3. An instrument according to claim 2, characterized in that there is arranged in the beam path of the light receiving device downstream of the microscope lens (L4) a semi-transparent mirror (S2) for conducting light to the detector (8) and to an ocular (14).

4. An instrument according to claim 2, characterized in that the light transmitting device includes a laser (10) with an associated lens system (L1,L2).

5. An instrument according to claim 2, characterized in that the light transmitting device includes a zoom lens system.

6. An instrument according to claim 1, characterized in that the means for producing said relative movement are arranged, during said relative movement, to maintain a constant distance between on one hand the light transmitting (10,L1,L2) and light receiving devices (L3,L4,8) and on the other a reference plane (13) of the workpiece (3), the point at which the light received via the light receiving device (L3,L4) impinging on the detector varying with the topography of the surface (2) of the workpiece (3).

7. An instrument according to claim 1, characterized in that the means for providing said relative movement are arranged to displace a reference plane (13) of the workpiece (3) relative to the light transmitting (10,L1,L2) and light receiving (L3,L4,8) devices in the inherent plane of the reference plane (13), and to displace the light transmitting and light receiving devices in direction (16) towards and away from said direction (16) towards and away from said surface (2) so that the impingement point of the light received, via the light receiving device, on the detector (8) is constant; and in that a position sensor (23) is provided for detecting variations in distance between on one hand the light transmitting and light receiving devices and the reference plane (13) on the other, these variations corresponding to the topography of the workpiece surface (2).

8. An instrument as defined in claim 1, wherein said angle ($\gamma_1$) is smaller than approximately 5 degrees.

9. An instrument as defined in claim 1, wherein said light transmitting device includes means which transmits a light beam onto the surface and illuminates a sharp and small spot on the surface.

* * * * *

UNITED STATES PATENT AND TRADEMARK OFFICE
CERTIFICATE OF CORRECTION

PATENT NO. : 4,764,016
DATED : August 16, 1988
INVENTOR(S) : GUNNAR JOHANSSON

It is certified that error appears in the above-identified patent and that said Letters Patent is hereby corrected as shown below:

Column 4, line 46, "assurtion" should be --assumption--.

Column 8, line 45, "reeiving" should be --receiving--.

, line 53, before "in" insert a semi-colon (;).

, line 57, correct the hyphenated word

--position-responsive--.

Signed and Sealed this

Thirty-first Day of January, 1989

Attest:

DONALD J. QUIGG

*Attesting Officer*      *Commissioner of Patents and Trademarks*